No. 851,882. PATENTED APR. 30, 1907.
C. P. HARMISON.
BEEHIVE.
APPLICATION FILED JAN. 5, 1907.

3 SHEETS—SHEET 1.

Witnesses
J. J. Sheehy Jr.
N. C. Healy

Inventor
C. P. Harmison.
By James Shuhy
Attorney

No. 851,882.
PATENTED APR. 30, 1907.
C. P. HARMISON.
BEEHIVE.
APPLICATION FILED JAN. 5, 1907.
3 SHEETS—SHEET 2.
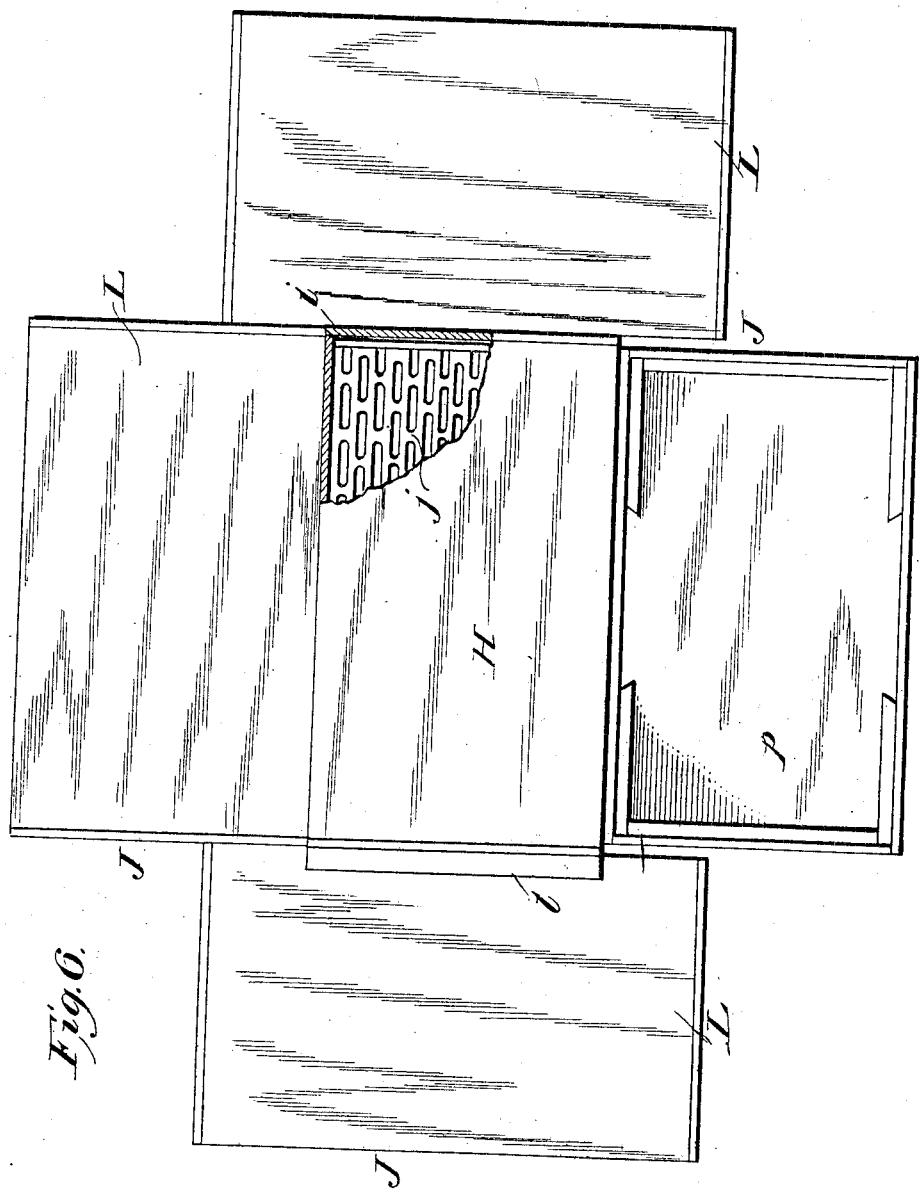

No. 851,882. PATENTED APR. 30, 1907.
C. P. HARMISON.
BEEHIVE.
APPLICATION FILED JAN. 5, 1907.
3 SHEETS—SHEET 3.
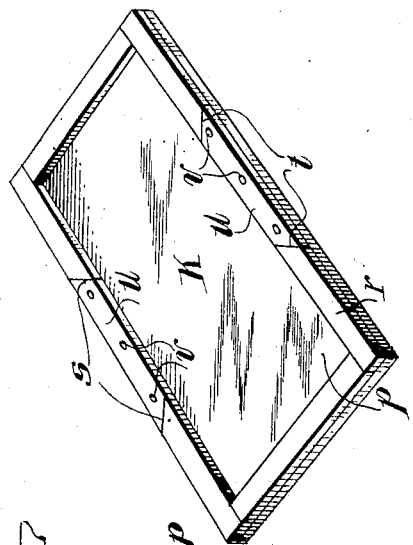
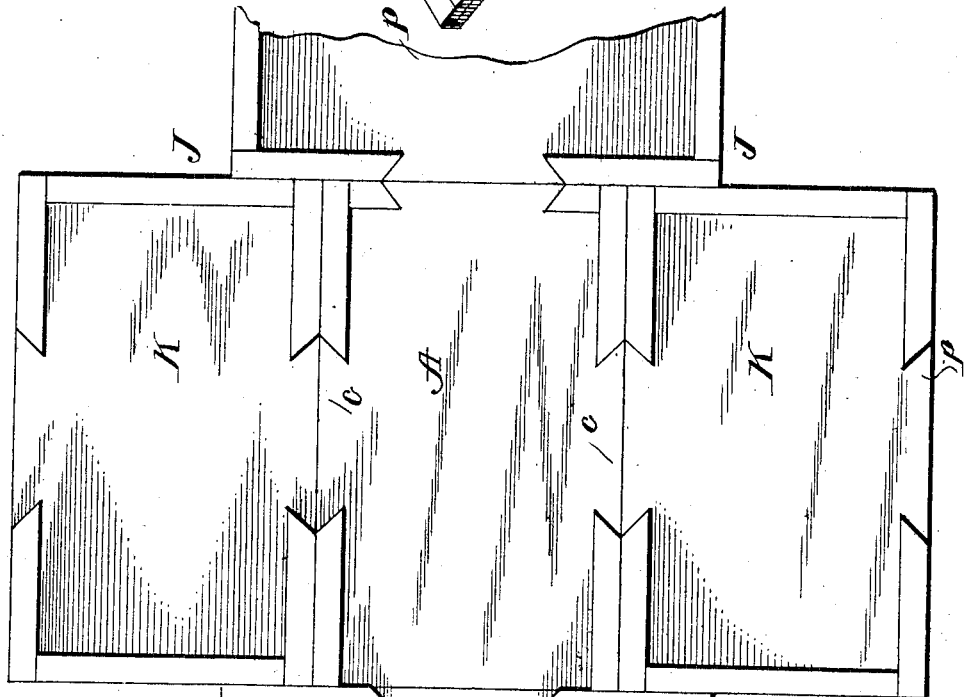
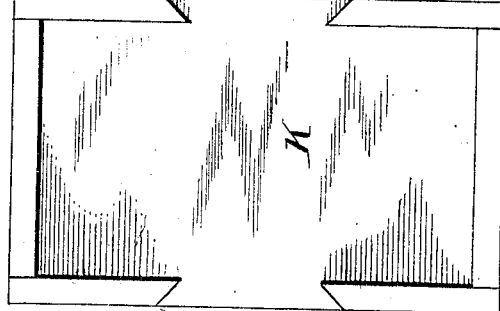
Witnesses
J. J. Sheehy Jr.
N. C. Healy
Inventor
C. P. Harmison
By
James J. Sheehy
Attorney

UNITED STATES PATENT OFFICE.

CALVIN P. HARMISON, OF RICE LAKE, WISCONSIN.

BEEHIVE.

No. 851,882.      Specification of Letters Patent.      Patented April 30, 1907.

Application filed January 5, 1907. Serial No. 350,989.

*To all whom it may concern:*

Be it known that I, CALVIN P. HARMISON, a citizen of the United States, residing at Rice Lake, in the county of Barron and State of Wisconsin, have invented new and useful Improvements in Beehives, of which the following is a specification.

My invention pertains to bee-hives; and it has for one of its objects to provide a hive susceptible of being so arranged as to effectually prevent swarming, and this without preventing worker bees passing freely through lower and upper screens between which the queen is confined.

Another object of the invention is the provision of a hive having one or a plurality of surplus supers arranged in such manner that the bees do not have to pass through the brood chamber or through screens in order to reach the surplus super or supers, but on the other hand may freely pass directly into the supers or supers and work to good advantage and produce a large quantity of honey.

Figure 1:
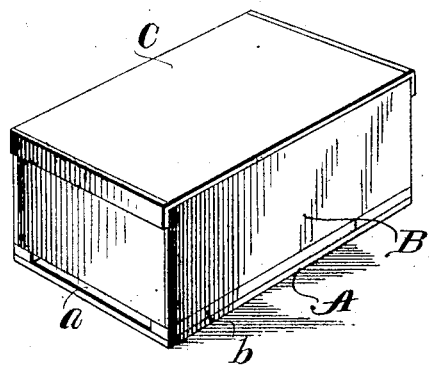
Figure 2:
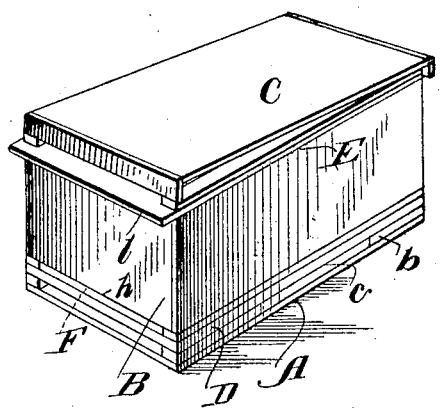
Figure 3:
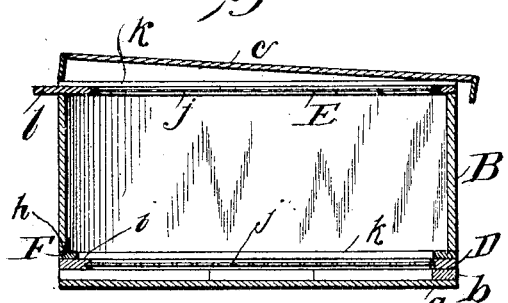
Figure 5:
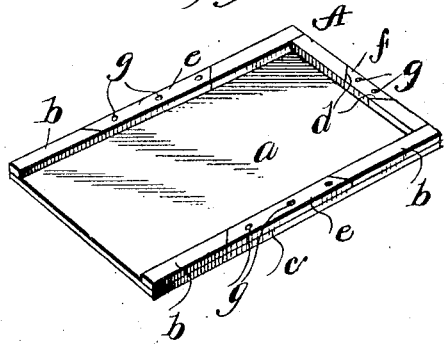
Figure 4:
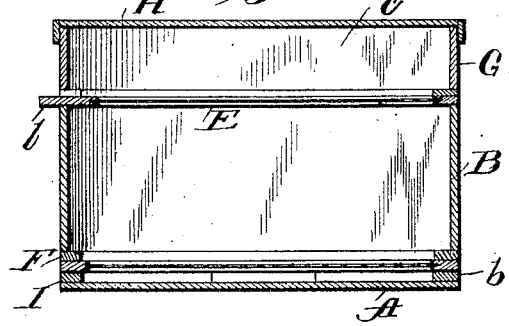

Other advantageous features of the invention will be fully understood from the following description and claims when the same are read in connection with the accompanying drawings, forming part of this specification, in which:

Figure 1 is a perspective view of parts of my improvements arranged to form a common hive. Fig. 2 is a similar view illustrating parts arranged to form a non-swarming hive. Fig. 3 is a vertical section taken through the longitudinal center of the latter. Fig. 4 is a view similar to Fig. 3 illustrating the employment of a surplus super and its cap on the hive box. Fig. 5 is a detail perspective view of the hive bottom, showing the upper side thereof. Fig. 6 is a plan view illustrating the manner in which surplus supers and their bottoms and caps are grouped about the lower portion of the hive; the cap of one surplus super being removed, and the cap of the surplus super above the hive body being partly broken away. Fig. 7 is a plan view, partly broken away, showing the manner in which the bottom of the hive and the bottoms of the grouped supers are connected by the passages thereof. Fig. 8 is a perspective view showing the upper side of one of the grouped supers before the blocks are removed therefrom.

Similar letters designate corresponding parts in all of the views of the drawings, referring to which:

A is the hive bottom or bottom board; B, the rectangular hive box thereof; and C, the cap. These parts when arranged as shown in Fig. 1 form an ordinary hive.

The hive bottom A best shown in Fig. 5 comprises a base board $a$, a strip $b$ fixed on the upper side of the base board and extending along the two side edges and the back edge thereof and having side openings $c$ and a back opening $d$, and closure blocks $e$ $e$ and $f$ removably arranged in the openings $c$ and $d$, respectively, and held in such positions when desired by short brads $g$ driven through the blocks and into the baseboard $a$. From this it will be understood that the blocks $e$ and $f$ may be readily removed when it is desired to utilize the openings $c$ and $d$ as passages in the manner hereinafter described.

In Figs. 2 and 3, the hive is shown as a non-swarming hive, and in combination with the bottom A, hive box B and cap C, a lower screen D, an upper screen E, and an entrance block F are employed; the lower screen D being interposed between the bottom A and hive box B and the upper screen E between the hive box B and cap C, and the entrance block F being placed in the opening $h$, above the lower screen D. The lower screen D comprises a rectangular frame $i$, a foraminated plate $j$ carried thereby, and a ledge $k$ fixed on the frame $i$ and extending along the side edges and back edge thereof. The upper screen E is similar to the lower screen D except that its frame is provided at its front end with a lighting board $l$. The entrance block F placed in the opening at the forward end of the frame of screen D as stated in the foregoing, obviously closes such end of the screen frame.

With the parts arranged as shown in Figs. 2 and 3, it will be apparent that the queen may be confined below the lower and upper screens D and E and cannot get out of the hive either at the top or bottom thereof. The worker bees, however, because of their comparatively small size are free to pass through either of the screens. As no swarm will issue when the queen cannot get out, it will be apparent that the structure described constitutes an efficient non-swarming hive; and it will also be seen that the worker bees can store their surplus honey to greater advantage than in an ordinary hive as will be presently described. When a surplus super G and its cap H are arranged on the upper screen E, and the entrance below the lower screen D is closed by an entrance block I, as shown in Fig. 4, it will be seen that the hive has but one entrance— i. e., the one above the lighting board. The worker bees will readily learn to go through this entrance directly into the super G. This is materially advantageous since it obviates the necessity of the worker bees passing through the brood chamber or through one or more screens in order to get to the surplus super; also, because there is nothing to detain the worker bees in passing into the super and hence each can work to the best advantage and produce a large quantity of honey.

By reference to Figs. 6, 7 and 8, the surplus supers J grouped about the bottom A of the hive will be understood as will also the bottoms K and caps L of said supers. The supers J are preferably of the same construction as the before described super G while the caps L are similar to the caps H. The bottoms K respectively comprise a base board p, a strip r fixed on the upper side of the base board and having openings s and t in their side portions, and blocks u removably arranged in said openings and detachably held to the base board p by short brads v. When the blocks u are removed from the openings s and t of the bottoms K, and said bottoms K, surplus supers J and caps L are grouped about the bottom A, and the blocks e e and f of said bottom A and the entrance block I are removed as shown in Figs. 6 and 7, it will be apparent that the worker bees have five entrances to the hive box, one through the surplus super G and one through each of the four surplus supers J. This is advantageous in case of large swarms and because it obviates the necessity of superposing the plurality of surplus supers on the hive box B, which arrangement is objectionable because the worker bees must pass up through the brood chamber to the supers and the bees working in the uppermost supers must pass through the lower ones to get to the particular one in which they are working.

It will be gathered from the foregoing that the convenience of storing the honey in the supers G and J prolongs the lives of the worker bees; the workers passing from the outer air directly into the supers and always having plenty of room to travel. Moreover, as soon as the worker bees enter any one of the supers they are protected from the heat, and are not subjected to the heat in the brood chamber. It will further be seen that the direct passage of the worker bees from the outer air directly into the surplus supers relieves the queen and those bees working in the brood chamber from all the workers having to pass through the brood chamber with their stores, and thus gives the queen and her helpers ample room and sufficient ventilation.

To prevent swarming to advantage the brood must be taken from the queen and she must be given new combs or foundation starters for more brood. To meet this necessity I arrange a hive box B on one of the bottoms K and place the brood in it and arrange it at one of the entrances of the hive bottom A. The bees will enter the said hive box B and will hatch the brood out quite as well as if left in the main hive. In hiving a swarm, the bees will be run in over the lower screen D.

When surplus supers are grouped about the bottom A of the hive as shown in Figs. 6 and 7, should it be desired to open the hive, there are no supers to handle which is obviously an important advantage. When a plurality of supers G are used on top of the upper screen E with the entrance above the lighting board l open, the lower entrance openings are closed and no supers are used for surplus honey about the bottom A. The brood to be hatched can be placed at any one of the openings of the bottom A. When desired, the outer entrances of the bottoms K of the supers at the sides and back of bottom A may be closed, and the bees made to enter the front end of the hive bottom A and pass from there into the supers J.

I have deemed it unnecessary to illustrate frames in the box B of the hive since said frames form no part of my invention.

It will be gathered from the foregoing that my novel hive with only the bottom screen constitutes a non-swarming hive, and that the upper screen is really essential only when a super is employed as in Fig. 4. When the upper screen is not employed the hive box will be covered by a cap.

Having described my invention, what I claim and desire to secure by Letters-Patent, is:

1. A bee hive comprising a bottom board having a strip on its upper side extending along its side and back edges, a screen removably arranged on the bottom board and having a frame and a strip on the upper side of the frame extending along the side and back edges thereof, an entrance block closing the opening between the forward ends of said strip, and a hive box removably arranged on the said strip of the screen.

2. A bee hive comprising a bottom board having a strip on its upper side extending along its side and back edges, a screen removably arranged on the bottom board and having a frame and a strip on the upper side thereof extending along the side and back edges of the frame, an entrance block closing the opening between the forward ends of said strip, a hive box removably arranged on the said strip of the screen, and a screen removably arranged on the hive box and having a frame and a strip on the upper side of the frame extending along the back and side edges thereof.

3. A bee hive comprising a bottom board having a strip on its upper side extending along its side and back edges, a screen removably arranged on the bottom board and having a frame and a strip on the upper side of the frame extending along the side and back edges thereof, an entrance block closing the opening between the forward ends of said strip, a hive box removably arranged on the said strip of the screen, and a screen removably arranged on the box and having a frame and a strip on the upper side of the frame extending along the back and side edges thereof, and also having a forwardly extending lighting board.

4. A bee hive comprising a bottom board having a strip on its upper side extending along its side and back edges, a screen removably arranged on the bottom board and having a frame and a strip on the upper side of the frame extending along the side and back edges thereof, an entrance block closing the opening between the forward ends of said strip, a hive box removably arranged on the said strip of the screen, a surplus super arranged above the box, and a screen removably interposed between the box and said surplus super and having a frame and a strip on the upper side of the frame extending along the back and side edges thereof.

5. A bee hive comprising a hive box, a bottom board arranged below the box and having a base and a raised portion extending along the edges of the base and one or a plurality of openings in said raised portion, and also having one or more removable blocks for closing the openings, surplus supers grouped about the bottom board and each having a bottom made up of a base and a raised portion extending along the edges of the base and provided with one or more openings and blocks for controlling said openings.

6. A bee hive comprising a hive box, a bottom board arranged below the hive box and having a base and a raised portion thereon extending along the side and back edges of the base and also having openings in said raised portion and removable blocks for controlling the openings, surplus supers grouped about the bottom board below the hive box, caps removably arranged on said surplus supers, and bottoms removably arranged below the surplus supers and having bases and raised portions extending along the edges of the bases and also having openings in said raised portions and blocks for controlling the same.

7. A bee hive comprising a main portion having a box, and a bottom board removably arranged below the box, surplus supers grouped about the main portion, bottoms removably arranged below the surplus supers and communicating with the bottom board of the main portion, and caps removably arranged on the surplus supers.

In testimony whereof I have hereunto set my hand in presence of two subscribing witnesses.

CALVIN P. HARMISON.

Witnesses:
J. B. FLEMING,
ARTHUR SMITH.